United States Patent
Elliott-McCrea et al.

(10) Patent No.: US 8,484,226 B2
(45) Date of Patent: Jul. 9, 2013

(54) MEDIA RECOMMENDATIONS FOR A SOCIAL-SOFTWARE WEBSITE

(75) Inventors: Kellan Elliott-McCrea, Brooklyn, NY (US); Winter Mason, New York, NY (US); Siddharth Suri, New York, NY (US); Jake Hofman, New York, NY (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/179,522

(22) Filed: Jul. 9, 2011
(Under 37 CFR 1.47)

(65) Prior Publication Data
US 2013/0013622 A1    Jan. 10, 2013

(51) Int. Cl.
*G06F 17/30* (2006.01)
(52) U.S. Cl.
CPC ............... *G06F 17/30616* (2013.01)
USPC .................... 707/751; 707/E17.005
(58) Field of Classification Search
CPC ................................. G06F 17/30616
USPC .......... 707/751, 748, 736, 999.003
See application file for complete search history.

(56) References Cited

U.S. PATENT DOCUMENTS

| | | | |
|---|---|---|---|
| 6,408,288 B1 * | 6/2002 | Ariyoshi | 706/22 |
| 7,624,095 B2 * | 11/2009 | Majumder | 705/7.29 |
| 2008/0154931 A1 * | 6/2008 | Jacobs et al. | 707/101 |
| 2008/0209350 A1 * | 8/2008 | Sobotka et al. | 715/762 |
| 2008/0243637 A1 * | 10/2008 | Chan et al. | 705/27 |
| 2010/0138443 A1 * | 6/2010 | Ramakrishnan et al. | 707/769 |

* cited by examiner

*Primary Examiner* — Miranda Le
(74) *Attorney, Agent, or Firm* — Martine Penilla Group, LLP

(57) ABSTRACT

Collaborative-filtering software creates a neighborhood using a map-reduce architecture by pair-wise application of a similarity measure to a sparse matrix of users and items of media designated by the users. The collaborative-filtering software then generates recommendations for a particular user by rating items of media designated by other users in the neighborhood (but not the particular user). The collaborative-filtering software rates the item of media, using a weighted vote of the users in the neighborhood. The weighted vote depends at least in part on the mean similarity of the users in the neighborhood who have designated the item of media. Then the collaborative-filtering software records the item of media as a recommendation for subsequent presentation to the other user, if the rating of the item of media is among the highest in comparison to the ratings of other items of media designated by users in the neighborhood.

17 Claims, 10 Drawing Sheets

$$Jaccard: \quad S_{uv}^J = \frac{\sum_p R_{up} R_{vp}}{\sum_p (R_{up} + R_{vp} - R_{up} R_{vp})}$$

401

$$Weighted\ Jaccard: \quad S_{uv}^W = \frac{\sum_p \frac{1}{k_p} R_{up} R_{vp}}{\sum_p \frac{1}{k_p}(R_{up} + R_{vp} - R_{up} R_{vp})}$$

402

$$k_p = \sum_u R_{up}$$

403

$$PR_{up} = \frac{\sum_{v \in \mathcal{N}^k(u)} S_{uv} R_{vp}}{\sum_{v \in \mathcal{N}^k(u)} R_{vp}}$$

MEDIA RECOMMENDATIONS FOR A SOCIAL-SOFTWARE WEBSITE

BACKGROUND

Social-media websites such as Flickr and social-networking websites such as Facebook allow users to store and share media such as graphics, images, audio, and/or video. The users of such websites often number in the millions, as do the files storing the media.

On electronic commerce websites, personal recommendations are used to match users to products. Typically, the personal recommendations are generated offline through (1) content-based filtering based on the viewing/purchasing history of a single customer, and/or (2) collaborative filtering based on the viewing/purchasing histories of a number of similar customers.

Accurate personal recommendation as to media would be useful to the users of social-media and social-networking websites, if such recommendations can be generated through processes that are efficient in terms of time and computational resources.

SUMMARY

In an example embodiment, a processor-executed method is described for recommending media on a social-software website. According to the method, collaborative-filtering software creates a neighborhood using a map-reduce architecture by pair-wise application of a similarity measure to a sparse matrix of users and items of media designated by the users. The sparse matrix is derived from a log. The collaborative-filtering software then generates recommendations for a particular user by rating items of media designated by other users in the neighborhood (but not the particular user). The collaborative-filtering software rates the media items by using a weighted vote of the users in the neighborhood. The weighted vote depends at least in part on the mean similarity of the users in the neighborhood who have designated the media items. Then the collaborative-filtering software records the media items as recommendations for subsequent presentation to the particular user in a view in a graphical user interface displayed by a browser, if the ratings of the media items are among the highest in comparison to the ratings of other items of media designated by users in the neighborhood.

In another example embodiment, an apparatus is described, namely, a computer-readable storage medium which persistently stores a program for recommending media on a social-software website. The program might be a module in collaborative-filtering software. The program creates a neighborhood using a map-reduce architecture by pair-wise application of a similarity measure to a sparse matrix of users and items of media designated by the users. The sparse matrix is derived from a log. The program then generates recommendations for a particular user by rating items of media designated by other users in the neighborhood (but not the particular user). The program rates the media items using a weighted vote of the users in the neighborhood. The weighted vote depends at least in part on the mean similarity of the users in the neighborhood who have designated the media items. Then the program records the media items as recommendations for subsequent presentation to the other user in a view in a graphical user interface displayed by a browser, if the ratings of the media items are among the highest in comparison to the ratings of other items of media designated by users in the neighborhood.

In another example embodiment, a processor-executed method is described for recommending media on a social-software website. According to the method, software maintains a log with a number of log entries, where each log entry includes an identifier for an item of media, an identifier for a user, and a time when the user designated the item. The software then identifies similar users through collaborative filtering of the log. The collaborative filtering employs a software framework based at least in part on a map-reduce architecture and a weighted Jaccard similarity measure that includes weighting with respect to popularity. The software generates recommendations as to items of media using a weighted vote of the similar users in a neighborhood rating the media items. The weighted vote depends at least in part on the mean similarity of the similar users in the neighborhood who have designated the media items. Then the software presents the recommendations that have the highest ratings in a view in a graphical user interface displayed by a browser.

Other aspects and advantages of the inventions will become apparent from the following detailed description, taken in conjunction with the accompanying drawings, which illustrate by way of example the principles of the inventions.

BRIEF DESCRIPTION OF THE DRAWINGS

FIG. 4A shows formulae (e.g., Jaccard similarity, weighted Jaccard similarity, and weighted vote) that might be used with a process for generating media recommendations for a social-software website, in accordance with an example embodiment.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
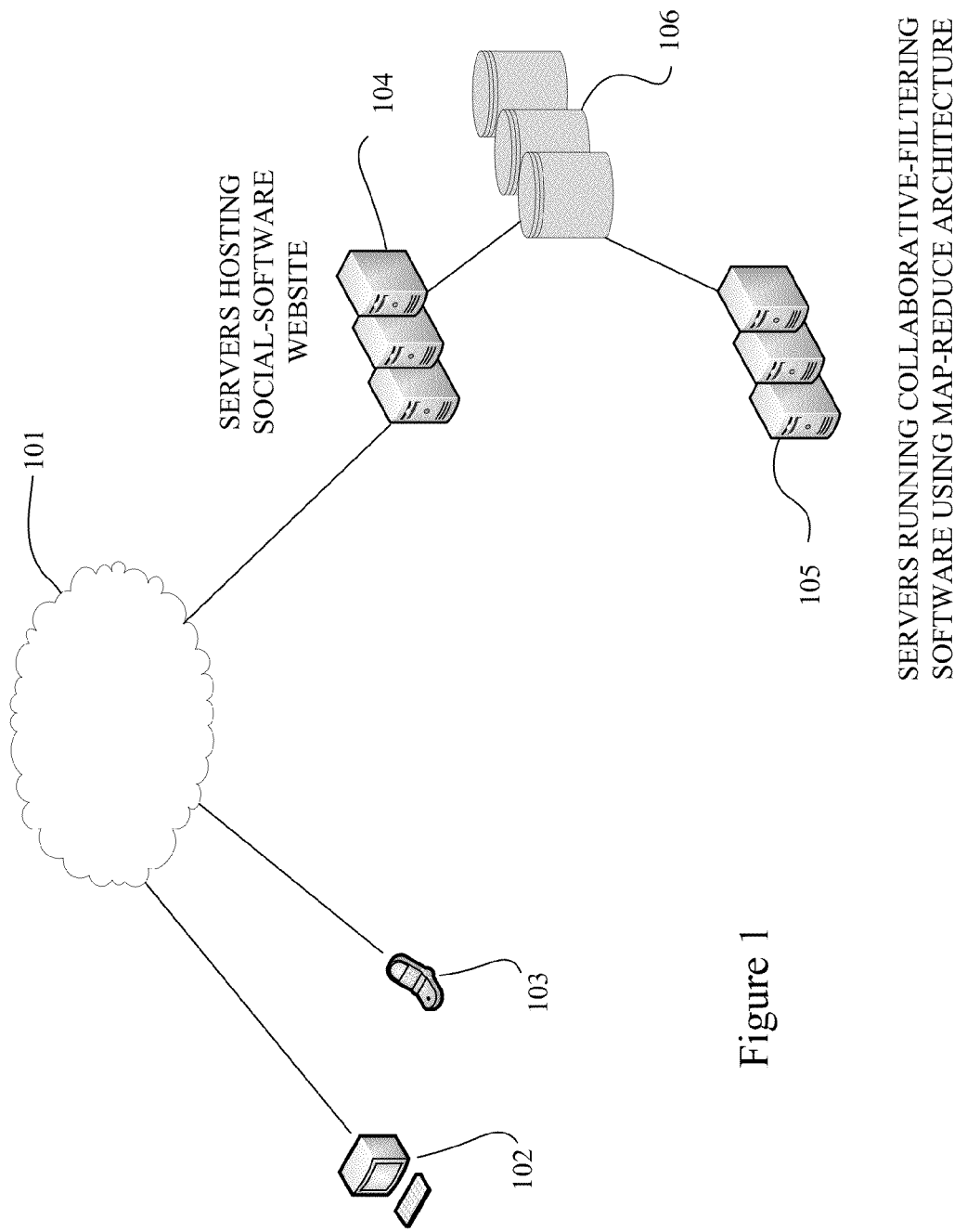
FIG. 1 is a simplified network diagram that illustrates a social-software website, in accordance with an example embodiment.

FIG. 1 is a simplified network diagram that illustrates a social-software website, in accordance with an example embodiment. As depicted in this figure, a personal computer 102 (which might be a laptop or other mobile computer) and a mobile device 103 (e.g., a smartphone such as an iPhone, Blackberry, Android, etc.) are connected by a network 101 (e.g., a wide area network (WAN) including the Internet, which might be wireless in part or in whole) with a website 104 that allows for the storing and sharing (e.g., through a social networking service) of media files (e.g., images, video, music, etc.). In an example embodiment, the website 104 is composed of a number of servers connected by a network (e.g., a local area network (LAN) or a WAN) to each other in a cluster or other distributed system. The servers are also connected (e.g., by a storage area network (SAN)) to persistent storage 106, which might include a redundant array of independent disks (RAID) and which might be used to store media files, user logs/histories, and media recommendations (e.g., in a database), among other things, in an example embodiment.

Personal computer 102 and the servers in website 104 and cluster 105 might include (1) hardware consisting of one or more microprocessors (e.g., from the x86 family or the PowerPC family), volatile storage (e.g., RAM), and persistent storage (e.g., a hard disk), and (2) an operating system (e.g., Windows, Mac OS, Linux, Windows Server, Mac OS Server, etc.) that runs on the hardware. Similarly, in an example embodiment, mobile device 103 might include (1) hardware consisting of one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computer 102 and mobile device 103 might each include a browser as an application program or part of an operating system. Examples of browsers that might execute on personal computer 102 include Internet Explorer, Mozilla Firefox, Safari, and Google Chrome. Examples of browsers that might execute on mobile device 103 include Safari, Mozilla Firefox, Android Browser, and Palm webOS Browser. It will be appreciated that users of personal computer 102 and mobile device 103 might use browsers (and client applications such as Flickr iPhone App) to communicate with social-software running on the servers at website 104. Examples of website 104 include a website such as Facebook, Flickr, TwitPic, MySpace, YouTube, Netflix, and other commercial websites that store streaming media, among others. Also connected (e.g., by a SAN) to persistent storage 106 is another cluster 105 of servers that execute collaborative-filtering software which might, in turn, include distributed-computing software based on a map-reduce architecture, e.g., Map-Reduce, Hadoop, Pig, etc. For further details regarding such an architecture, see U.S. Pat. No. 7,650,331 (entitled "System and Method for Efficient Large-Scale Data Processing" and issued on Jan. 19, 2010), which discusses Map-Reduce, and co-owned U.S. Published Patent Application No. 2008/0098370 (entitled "Formal Language and Translator for Parallel Processing of Data" and filed on Oct. 20, 2006), which discusses Hadoop and Pig. In an alternative example embodiment, the collaborative-filtering software might be a component of a larger software system that also performs content-based filtering, e.g., a hybrid recommender system. For further details as to hybrid recommender systems, see U.S. Pat. No. 6,266,649 (entitled "Collaborative Recommendations Using Item-to-Item Similarity Mappings" and issued on Sep. 18, 1998).

In an example embodiment, the software described in detail below might be a component of the collaborative-filtering software, receiving user logs/histories from persistent storage 106 as inputs and transmitting media recommendations to persistent storage 106 as outputs. From there, the media recommendations might be accessed in real-time or near real-time by social-software at website 104 and transmitted as media recommendations or items of media to personal computer 102 and/or mobile device 103 for display in a view in a graphical user interface (GUI) presented by a browser. In an alternative example embodiment, the collaborative-filtering software might generate real-time or near real-time media recommendations, e.g., if the number of users and/or media items is relatively small.

Figure 2:
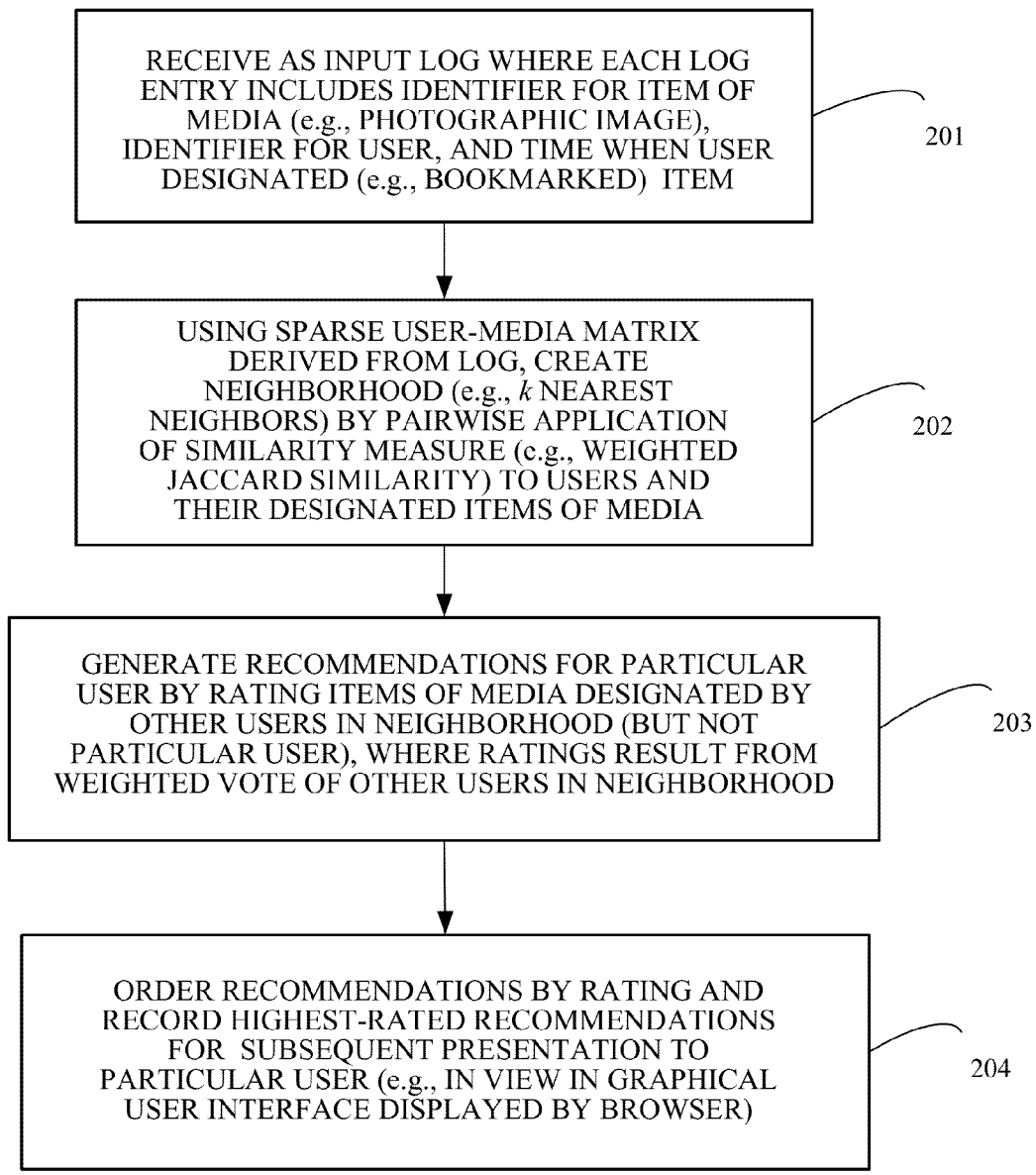
FIG. 2 is a flowchart diagram that illustrates a process for generating media recommendations for users of a social-software website, in accordance with an example embodiment.

FIG. 2 is a flowchart diagram that illustrates a process for generating media recommendations for users of a social-software website, in accordance with an example embodiment. As indicated above, this process might be performed by collaborative-filtering software running on cluster 105 with access to logs stored on persistent storage 106. As depicted in FIG. 2, the collaborative-filtering software receives as an input a log in which each log entry includes (a) an identifier for an item of media (e.g., photo image), (b) an identifier for a user, and (c) time when the user designated (e.g., bookmarked, marked as a "favorite", or "liked") the item, in operation 201. In an alternative example embodiment, each log entry might include other associated data, e.g., an adultness score. In operation 202, the collaborative-filtering software uses a sparse user-media matrix derived from the log to create a neighborhood (e.g., k nearest neighbors) by pair-wise application of a similarity measure (e.g., weighted Jaccard similarity) to users and their designated items of media. In an example embodiment, the log or matrix might be processed to remove entries that are relatively stale in terms of time of designation, e.g., by using only the top k most recent (in terms of time of designation) log entries or using only the log entries whose time of designation is after a particular cutoff point in terms of time of designation, e.g., nine months prior to the current date.

In operation 203, the collaborative-filtering software generates recommendations for a particular user by rating items of media designated by other users in the neighborhood, but not the particular user. In an example embodiment, the ratings result from a weighted vote of the other users in the neighborhood. Then in operation 204, the collaborative-filtering software orders the recommendations by rating and records the highest-rated recommendations for subsequent presentation to the particular user (e.g., in a view in a graphical user interface displayed by a browser), possibly after further filtering, e.g., to improve the diversity of results. For example, in an embodiment involving a photo-sharing site, the collaborative-filtering software might improve diversity by removing some of the photos of a photographer whose work is over-represented in the recommendations. In another alternative example embodiment, the collaborative-filtering software might remove of any recommendations with a non-zero adultness score and/or any recommendations that are inconsistent with a user's personalization data (e.g., a user history showing a preference for a particular geographic location). Also, in another alternative example embodiment, the collaborative-filtering software might order the highest-rated recommendations in terms of recency (e.g., most recent first) when recording them for subsequent presentation, where the order is based on time of first or last designation by one or more of the other users in the neighborhood.

As described above, each entry in the log input to the collaborative-filtering software in operation 201 includes a time when a user designated a media item. As used in this disclosure, "media" includes graphics, images, audio, and video. Also, as used in this disclosure, the term "designating" includes user action/inaction directly indicating interest in a media item and encompasses both explicit and implicit/passive relevance feedback. For example, the term "designating" includes bookmarking a media item, e.g., marking an image or a video as a "favorite" on the Flickr website. Additionally, the term "designating" includes clicking the "Like" widget for a graphic, image, or video on the Facebook website. The term "designating" also includes viewing (or imputed viewing by a user) of a media item for a particular period of time (e.g., 7 seconds).

Also as described above, the collaborative-filtering software creates a neighborhood using a similarity measure in operation 202. In an example embodiment, the neighborhood might be a neighborhood of k nearest neighbors, where k is approximately 10 if the number of recommendations to be presented to the user is approximately 20, as will be described further below in relation to the plots shown in FIG. 6.

Figure 3:
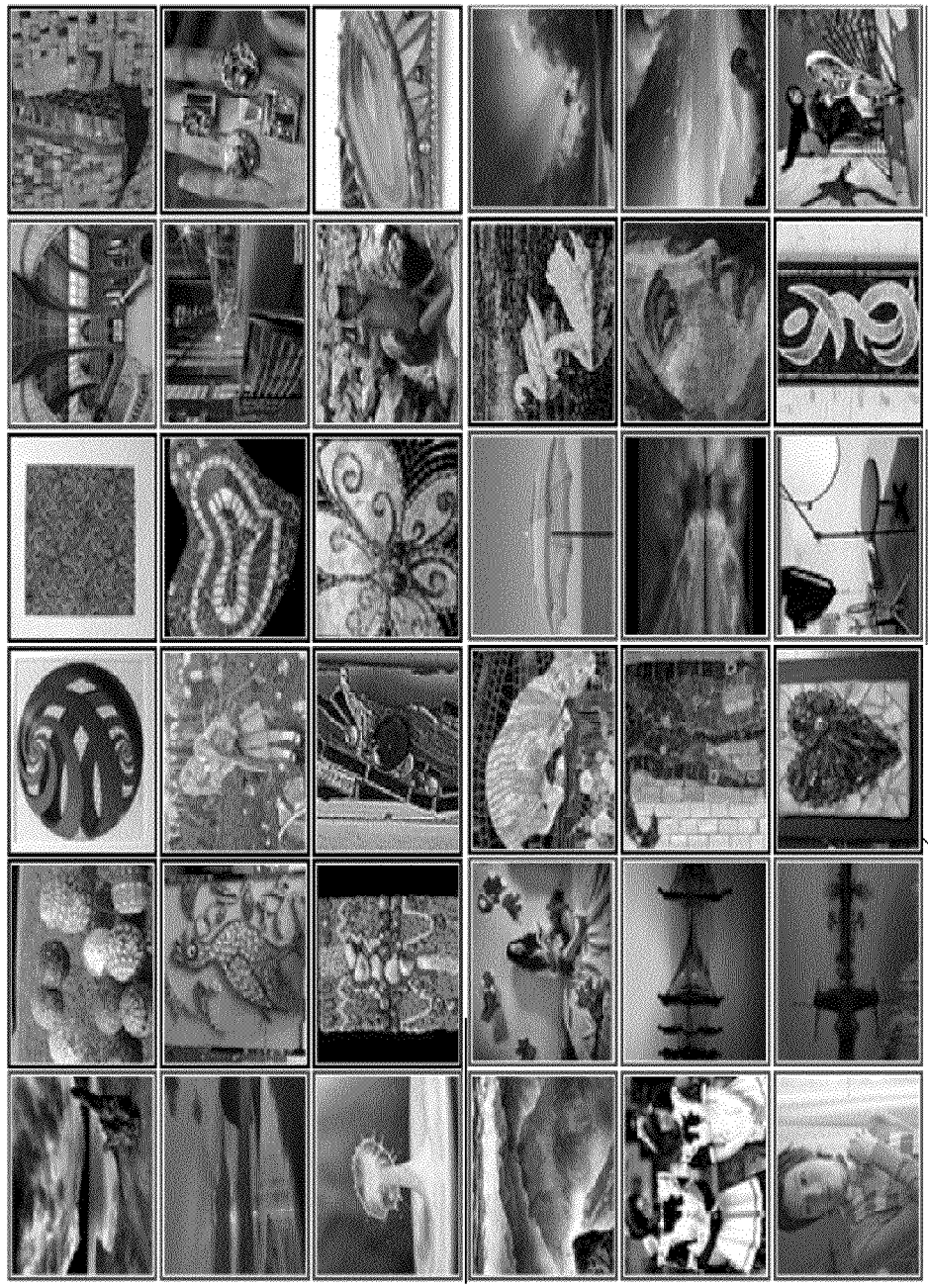
FIG. 3 shows a view in a graphical user interface displaying image recommendations, in accordance with an example embodiment.

FIG. 3 shows a view in a graphical user interface (GUI) displaying image recommendations, in accordance with an example embodiment. It will be appreciated that GUI view 301 relates to operation 204 of the process depicted in FIG. 2. In an example embodiment, the image recommendations in GUI view 301 might be ordered in terms of descending rating (e.g., as computed in operation 203 in FIG. 2) or descending recency (e.g., based on time of first or last designation by one or more of the other users in the neighborhood) from the top left corner of the view. In another example embodiment, these image recommendations might be randomly ordered in the view. Alternatively, image (or other media) recommendations from the process shown in FIG. 2 might be displayed in a GUI view along with other images determined to be potentially interesting to all users, using an algorithm such as the "interestingness" algorithm described in co-owned U.S. Published Patent Application No. 2006/0242139 (entitled "Interestingness Ranking of Media Objects" and filed on Feb. 8, 2006). Or, the image (or other media) recommendations from the process shown in FIG. 2 might be displayed in a GUI view along with other media and/or raw text posted by the contacts/friends/buddies of a user, e.g., in a Facebook News Feed generated by application of an EdgeRank algorithm.

FIG. 4A shows formulae (e.g., Jaccard similarity, weighted Jaccard similarity, and weighted vote) that might be used with a process for generating media recommendations for a social-software website, in accordance with an example embodiment. It will be appreciated that the first three formulae relate to operation 202 of the process depicted in FIG. 2, e.g., creating a nearest neighborhood with a similarity measure. Ratings used in these formulae are based on logs kept by Flickr, a social-media website that supports the sharing of photographic images and videos, among other things. As used in formulae, $R_{up}$ is a sparse U-by-P matrix for a set of U users and a set of P photos. $R_{up}$ is equal to 1 if user u has "favorited" (or bookmarked) a photo p and is equal to 0 otherwise.

Statistic 401 describes an equation for calculating the Jaccard similarity ($S^J$) between users u and v with respect to the set of photos P (or $\Sigma_p$). Statistic 402 describes an equation for the weighted Jaccard similarity ($S^W$) between users u and v with respect to set of photos P (or $\Sigma_p$), where $k_p$, as described in statistic 403 and used in statistic 402, gives the total number of favorites a photo p has received. It will be appreciated that the Jaccard similarity 401 between users gives the ratio of the intersection to the union of the users' sets of favorited photos. The weighted Jaccard similarity 402 modifies this ratio slightly by down-weighting photos by their popularity. The intuition here is that users who co-favorite popular photos are less similar than those who co-favorite less popular (e.g., niche) photos.

It will be appreciated that other similarity measures might be used by the collaborative-filtering software. In an alternative example embodiment, cosine similarity might be used instead of a Jaccard similarity measure. Or the collaborative-filtering software might use the Pearson product-moment correlation coefficient (PPMCC) as a similarity measure.

In an example embodiment, the sparse matrix $R_{up}$ might be adjusted prior to being used in similarity calculations, e.g., using a decay function that nulls designations of photos (e.g., sets the corresponding value in the sparse matrix $R_{up}$ to 0) if the time of designation as recorded in the log is beyond a particular limit. Similarly, in an example embodiment, the sparse matrix $R_{up}$ might be adjusted prior to being used in similarity calculations by nulling out designations of photos that have a non-zero adultness score.

The last formula in FIG. 4A relates to operation 203 of the process depicted in FIG. 2, e.g., taking a weighted vote of each user v in a nearest neighborhood $N^k(u)$ consisting of the top k (e.g., 10) most similar users to user u. Statistic 404 is the predicted rating ($PR_{up}$) for user u with respect to photo p and is a weighted vote over u's neighbors, where the predicted rating gives the mean similarity between u and all neighbors v who have favorited the photo p. It will be appreciated that a more conventional nearest neighbor prediction would give the weighted mean rating across neighbors, e.g., use a denominator of $S_{uv}$ instead of $R_{vp}$. It will further be appreciated that the use of the conventional weighted mean rating (instead of mean similarity) with the sparse matrix $R_{up}$ would result in $PR_{up}=1$ for photos of u's neighborhood since the ratings in $R_{up}$ are binary (e.g., 0 or 1), as opposed to real-valued or categorical. In an alternative example embodiment, the predicted rating might be given by the maximum similarity, rather than the mean similarity. Alternatively, the predicted rating might be given by a count of the number of neighbors who have favorited the photo.

It will be also appreciated that the data structures and calculations described above exploit the sparsity of the "favoriting" data as that data is recorded in the log. In an example embodiment, the similarity matrices and the ratings might be stored as dictionaries-of-dictionaries, providing constant-order lookup by user identifier or media (e.g., photo) identifier.

Further, it will be appreciated that calculation of the similarity measure leverages these data structures. For a given user u, the collaborative-filtering software calculates the non-zero elements of $S_{uv}$ as follows: (1) for each photo p that u has favorited, collect the union of all users v who have also favorited p; and (2) then calculate $S_{uv}$ using one of the formulae described above. Thus each user is compared to a much smaller subset than the entire population, avoiding a runtime quadratic in the number of users.

Figure 4B:
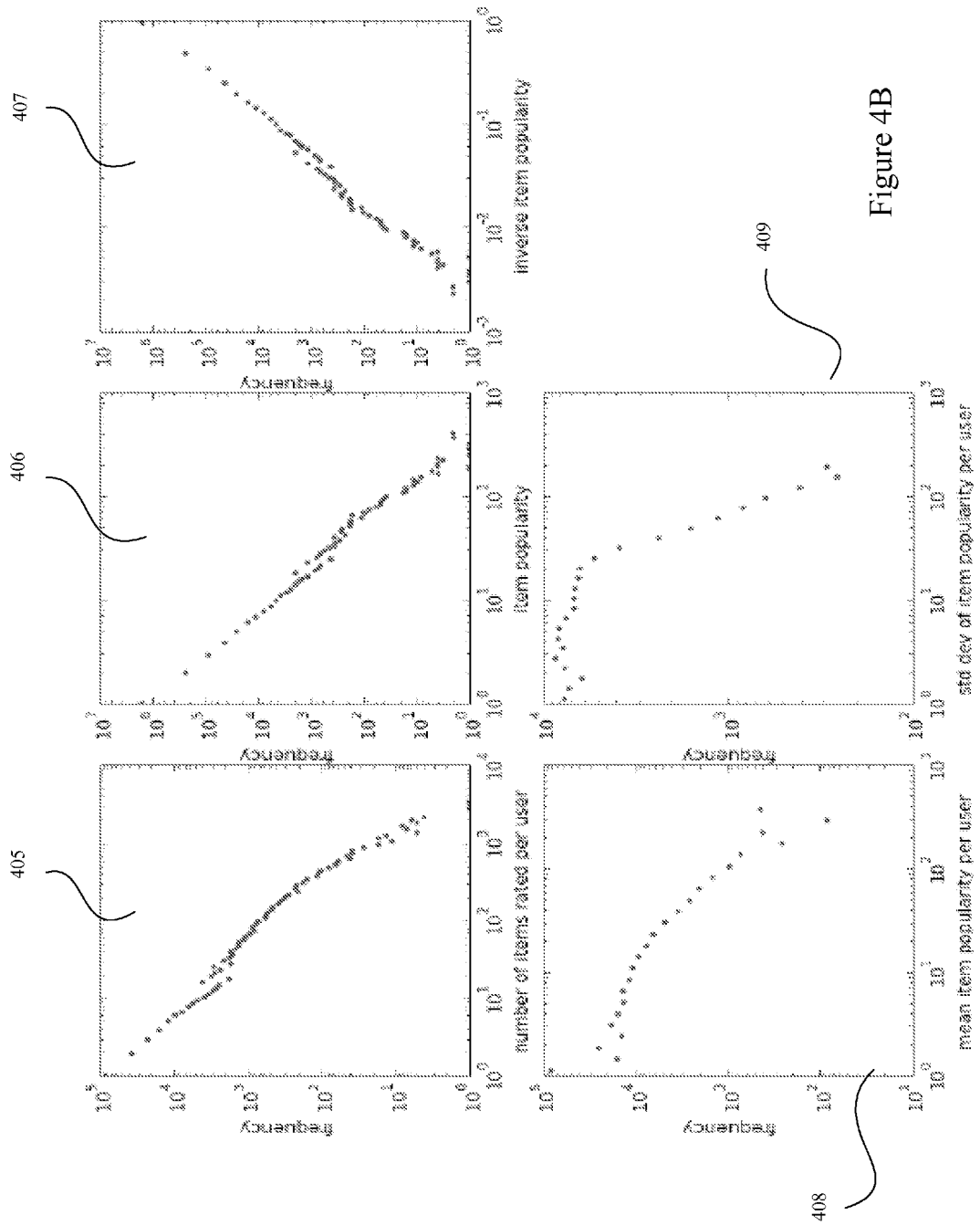
FIG. 4B shows plots of formulae associated with photos and users of the Flickr website.

These design choices find support in the plots in FIG. 4B of formulae associated with photos and users of the Flickr website. The first plot 405 shows the number of items rated per user (x-axis) plotted against frequency (y-axis). As indicated by this plot, most users rate only a relatively small number of photos. The second plot 406 shows item popularity (x-axis) plotted against frequency (y-axis). Here again, as indicated by this plot, the popularity of most photos is relatively small. The third plot 407 shows inverse popularity and is derived from the second plot 702. The fourth plot 408 shows the mean item popularity per user (x-axis) plotted against frequency (y-axis). As indicated by this plot, the mean popularity per user of most photos is relatively small. The fifth plot 409 shows the standard deviation of item popularity per user (x-axis) plotted against frequency (y-axis).

Figure 5A:
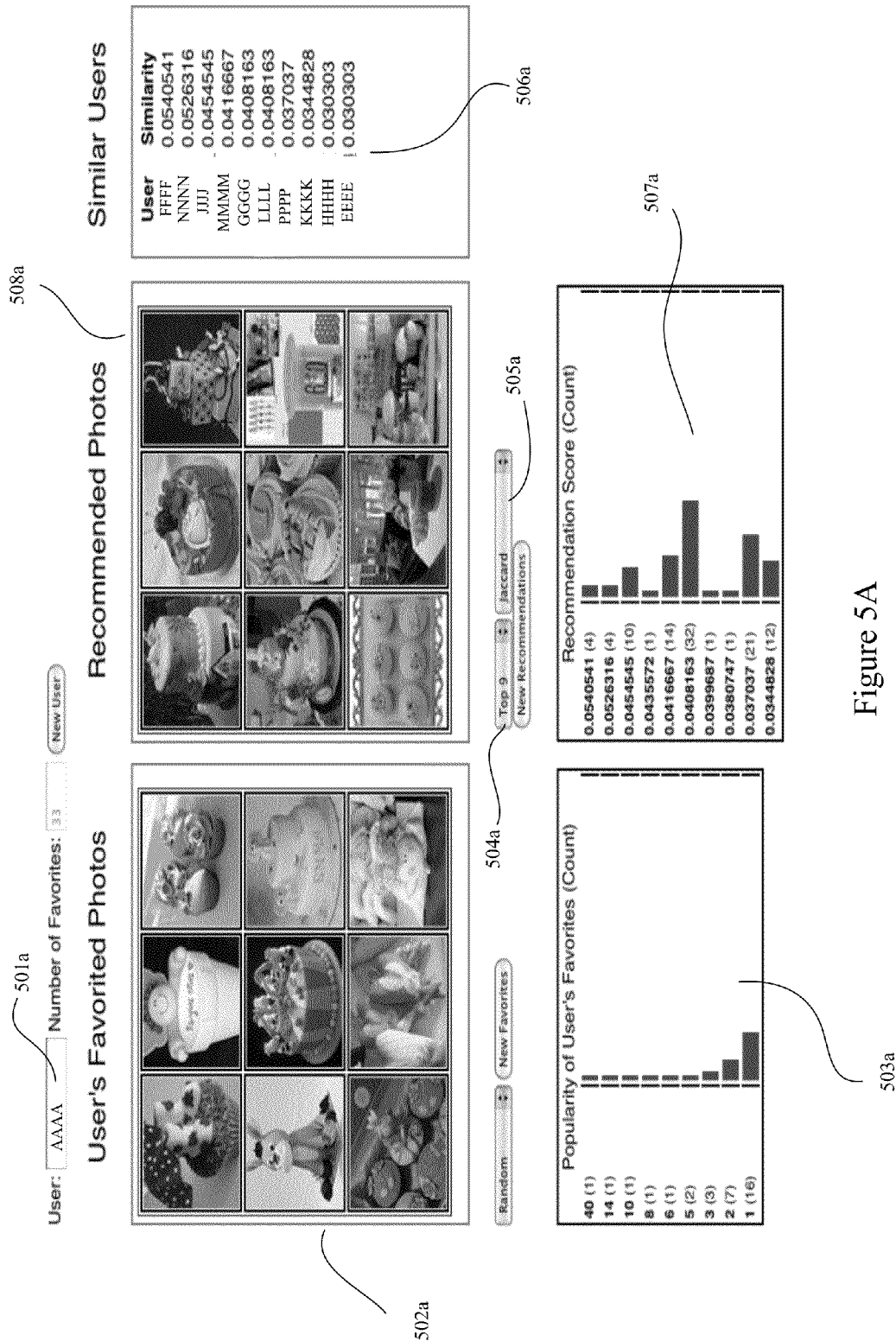
FIGS. 5A through 5D show generated recommendations for particular users of the Flickr website, in accordance with an example embodiment.

FIGS. 5A through 5D show generated recommendations for particular users of the Flickr website, in accordance with an example embodiment. As depicted in FIG. 5A, a user 501a (whose identifier is AAAA) has favorited the nine photos 502a, of varying popularity as depicted in graph 503a. Further, as depicted in this figure, the collaborative-filtering software has been configured to return the top 9 recommendations (504a) generated through application of a Jaccard similarity measure (505a). The figure also shows the neighborhood of similar users 506a and the recommend photos 508a, along with a count 507a of the recommendation scores, e.g., as generated in operation 203 in FIG. 2. It will be appreciated that the similar users 506a might be displayed to a user as potential contacts/friends/buddies (e.g., for extending online social networks), in the same GUI view as the recommended photos 508a or in a different GUI view. As can be seen from visual inspection, the recommended photos 508a are similar to the user's favorited photos 502a, insofar many of the former and the latter involve photos of cakes.

Figure 5B:
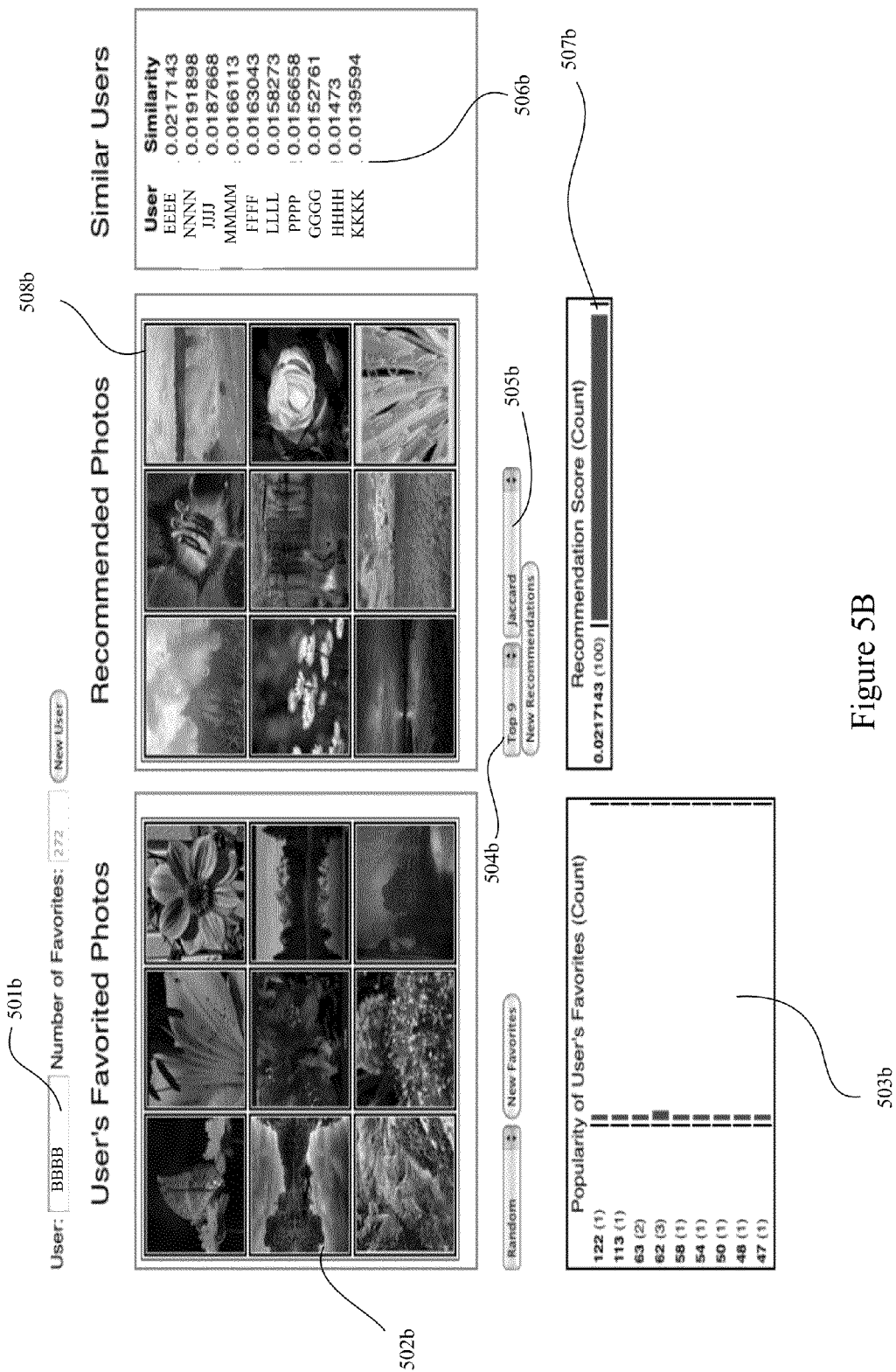

As depicted in FIG. 5B, a user 501b (whose identifier is BBBB) has favorited the nine photos 502b, of varying popularity as depicted in graph 503b. Further, as depicted in this figure, the collaborative-filtering software has been configured to return the top 9 recommendations (504b) generated through application of a Jaccard similarity measure (505b). The figure also shows the neighborhood of similar users 506b and the recommend photos 508b, along with a count 507b of the recommendation scores, e.g., as generated in operation 203 in FIG. 2. As can be seen from visual inspection, the recommended photos 508b are similar to the user's favorited photos 502b, insofar many of the former and the latter involve photos of plants/flowers.

Figure 5C:
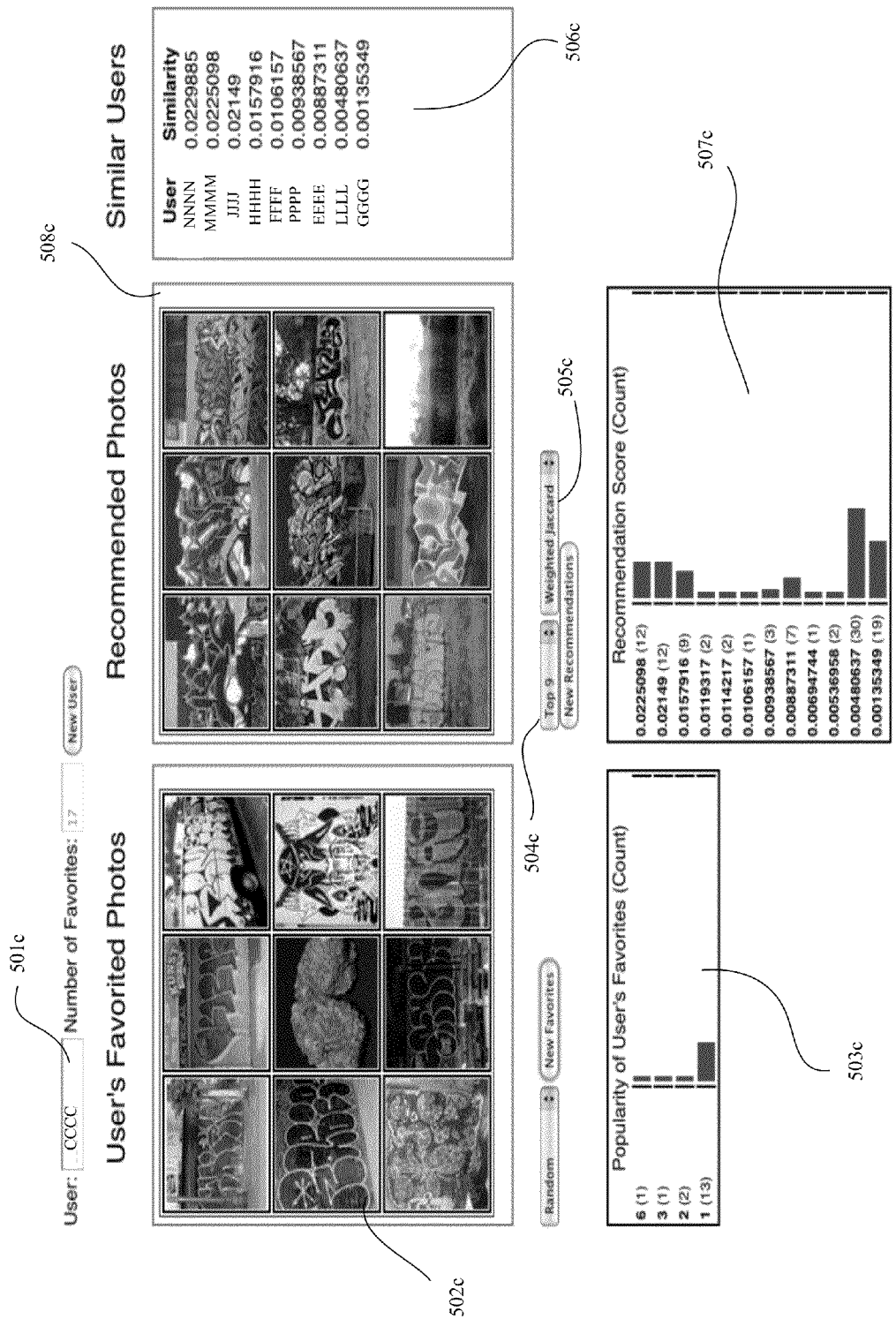

As depicted in FIG. 5C, a user 501c (whose identifier is CCCC) has favorited the nine photos 502c, of varying popularity as depicted in graph 503c. Further, as depicted in this figure, the collaborative-filtering software has been configured to return the top 9 recommendations (504c) generated through application of a Weighted Jaccard similarity measure (505c), rather than a simple Jaccard similarity. The figure also shows the neighborhood of similar users 506c and the recommend photos 508c, along with a count 507c of the recommendation scores, e.g., as generated in operation 203 in FIG. 2. As can be seen from visual inspection, the recommended photos 508c are similar to the user's favorited photos 502c, insofar many of the former and the latter involve photos of street art/graffiti.

Figure 5D:
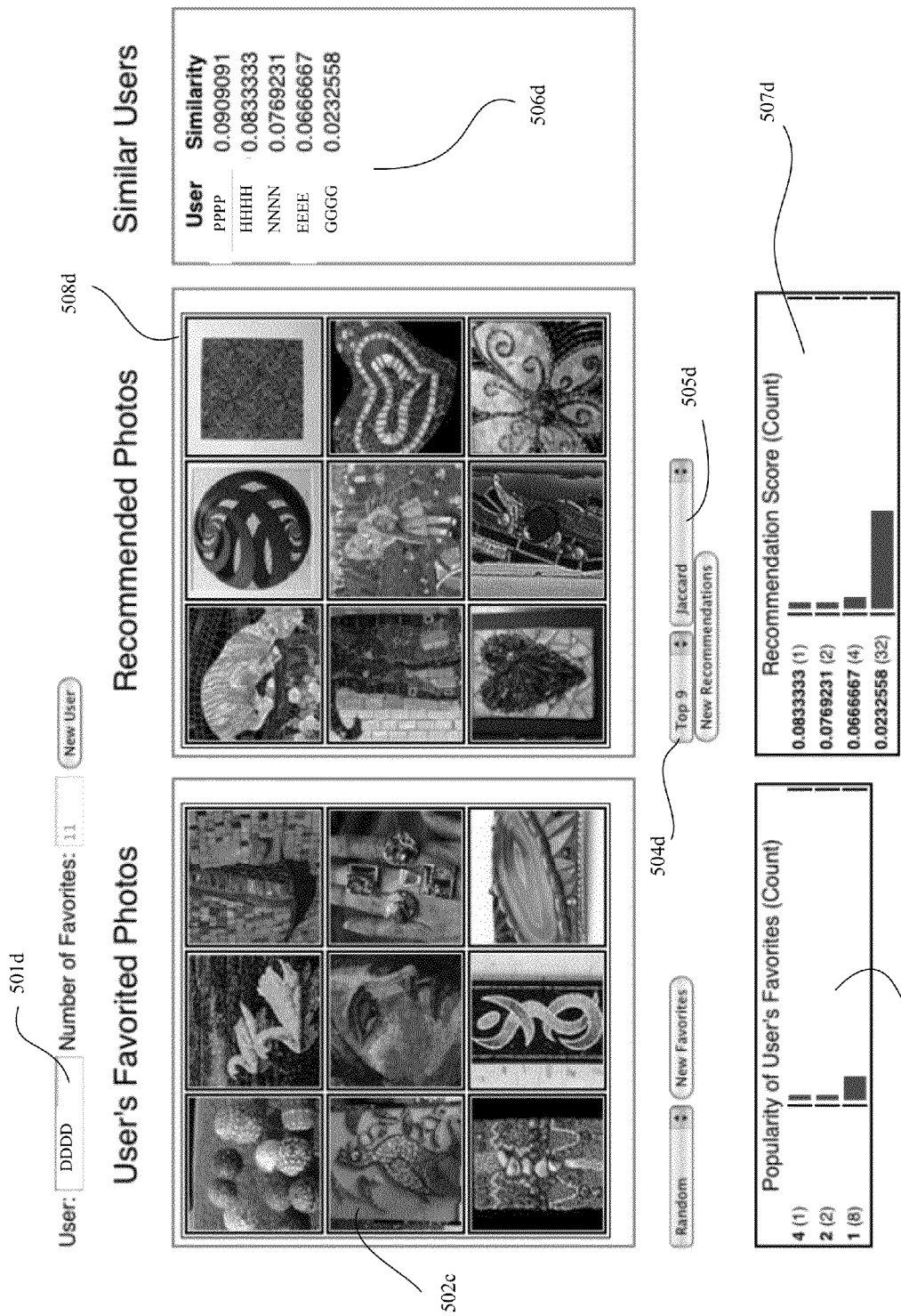

As depicted in FIG. 5D, a user 501d (whose identifier is DDDD) has favorited the nine photos 502d, of varying popularity as depicted in graph 503d. Further, as depicted in this figure, the collaborative-filtering software has been configured to return the top 9 recommendations (504d) generated through application of a Jaccard similarity measure (505d). The figure also shows the neighborhood of similar users 506d and the recommend photos 508d, along with a count 507d of the recommendation scores, e.g., as generated in operation 203 in FIG. 2. As can be seen from visual inspection, the recommended photos 508d are similar to the user's favorited photos 502d, insofar many of the former and the latter involve photos of mosaics.

Figure 6:
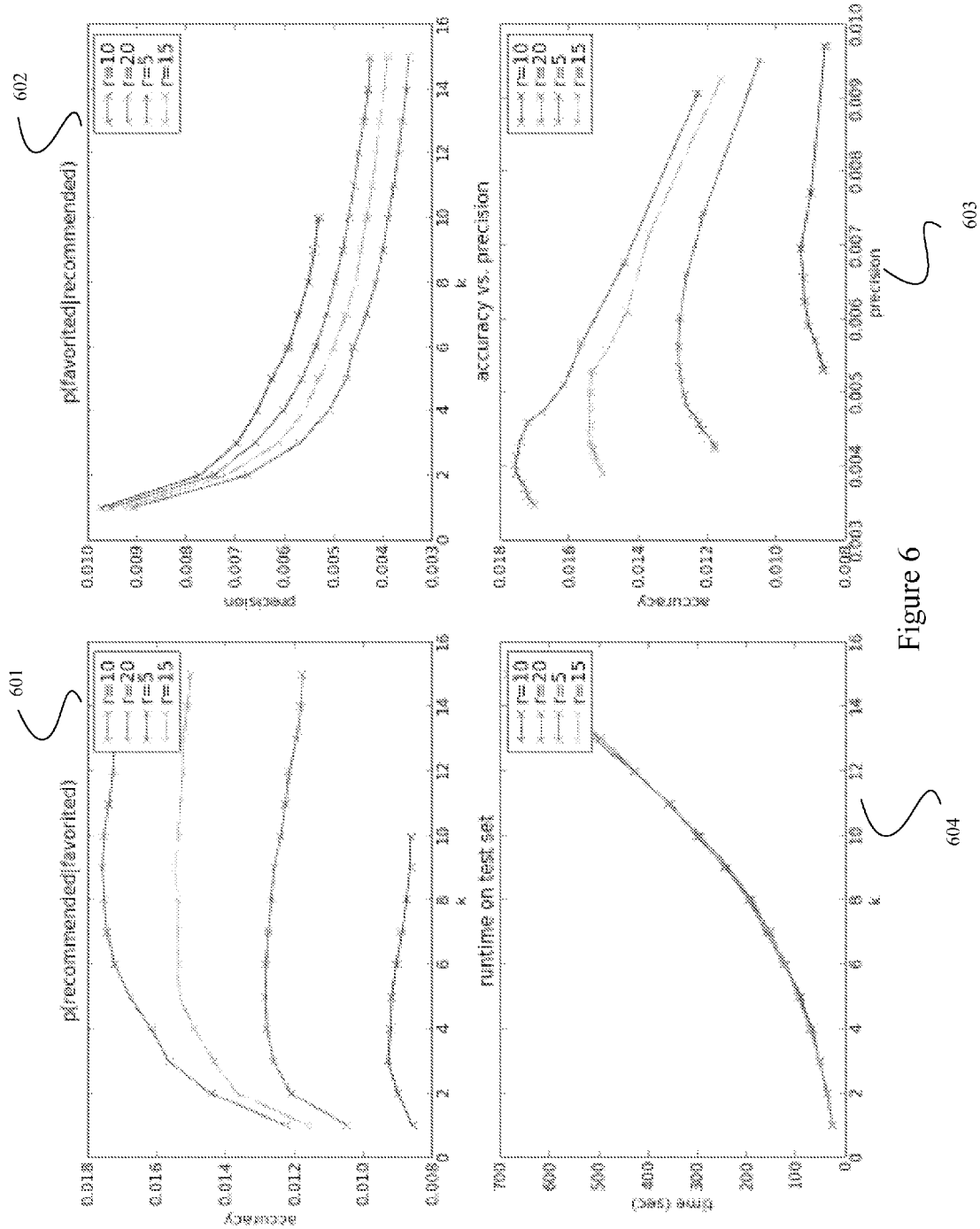
FIG. 6 show plots related to accuracy, precision, and runtime of generated recommendations for a relatively small sample of users of the Flickr website, in accordance with an example embodiment.

FIG. 6 show plots of accuracy, precision, and runtime of generated recommendations for a relatively small sample of users of the Flickr website, in accordance with an example embodiment. The plots result from holding out a random 20% of the data, using the remaining 80% to predict ratings, and evaluating predictions on this 20% test set. As used in the plots, accuracy quantifies the probability that the collaborative-filtering software recommends a photo, given that a user favorited it in the test set. Precision quantifies the probability that a user favorited a photo, given that the collaborative-filtering software recommends it in the test set. Also, as used in the plots, k is the size of a nearest neighborhood (e.g., the number of nearest neighbors) and r is the number of returned recommendations.

The first plot 601 shows the size of a nearest neighborhood k (x-axis) plotted against the accuracy of the recommended photos (y-axis), for various numbers of returned recommendations r. As indicated by this plot, accuracy tends to level off at a k of approximately 10, but increases as r increases from 5 at the bottom of the plot to 20 at the top of the plot. The second plot 602 shows the size of a nearest neighborhood k (x-axis) plotted against the precision of the recommended photos (y-axis), for various numbers of returned recommendations r. As indicated by this plot, precision decreases as r increases from 5 at the top of the plot to 20 at the bottom of the plot. The third plot shows precision (x-axis) plotted against accuracy (y-axis), for various numbers of returned recommendations r. As indicated by this plot, accuracy increases as r increases from 5 at the bottom of the plot to 20 at the top of the plot, for various values of precision. The fourth plot shows the size of a nearest neighborhood k (x-axis) plotted against the runtime in seconds on a test set (y-axis), for various numbers of returned recommendations r. As indicated by this plot, the runtime increases with k, but is not significantly affected by r. It will be appreciated that the plots indicate that accuracy and precision tend to be best in terms of this test set when k is approximately 10 and r is approximately 20.

The inventions described above and claimed below may be practiced with other computer system configurations including hand-held devices, microprocessor systems, microprocessor-based or programmable consumer electronics, mini-computers, mainframe computers and the like. The inventions might also be practiced in distributing computing environments where tasks are performed by remote processing devices that are linked through a network.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, the operations described above might be used to generate recommendations for items, including non-media items that are not stored on the website serving up the recommendations. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the specification and/or drawings.

What is claimed is:

1. A method for recommending media on a social-software website, comprising the operations of:
    creating a neighborhood using a map-reduce architecture by pair-wise application of a similarity measure to a sparse matrix of users and items of media designated by the users, wherein the sparse matrix is derived from a log, and wherein the measure of similarity is selected from the group consisting of Jaccard similarity, weighted Jaccard similarity, and weighted vote;
    identifying an item of media that has been designated by a first user in the neighborhood but not a second user in the neighborhood;
    rating the item of media, using a weighted vote of the users in the neighborhood, wherein the weighted vote depends at least in part on the mean similarity of the users in the neighborhood who have designated the item of media; and
    recording the item of media as a recommendation for subsequent presentation to the second user in a view in a graphical user interface displayed by a browser, if the rating of the item of media is among the highest in comparison to the ratings of other items of media designated by users in the neighborhood, wherein each operation of the method is executed by one or more processors.

2. The method of claim 1, further comprising the step of receiving as an input a log with a plurality of log entries, wherein each log entry includes an identifier for an item of media, an identifier for a user, and a time when the user designated the item.

3. The method of claim 1, wherein the items of media include photographic images.

4. The method of claim 1, wherein the map-reduce architecture includes a Pig implementation.

5. The method of claim 1, wherein the log or sparse matrix is processed to remove stale entries.

6. The method of claim 1, wherein recording of the second item of media as a recommendation depends on a measure of diversity.

7. The method of claim 1, wherein in a user designates an item of media by bookmarking, marking as a favorite, "liking," or otherwise explicitly indicating an interest in the item of media.

8. The method of claim 1, wherein in a user designates an item of media by viewing it for a particular period of time or otherwise implicitly indicating an interest in the item of media.

9. A computer-readable storage medium persistently storing a program, wherein the program, when executed, instructs a processor to perform the following operations:
    create a neighborhood using a map-reduce architecture by pair-wise application of a similarity measure to a sparse matrix of users and items of media designated by the users, wherein the sparse matrix is derived from a log, and wherein the measure of similarity is selected from the group consisting of Jaccard similarity, weighted Jaccard similarity, and weighted vote;
    identify an item of media that has been designated by a first user in the neighborhood but not a second user in the neighborhood;
    rate the item of media, using a weighted vote of the users in the neighborhood, wherein the weighted vote depends at least in part on the mean similarity of the users in the neighborhood who have designated the item of media; and
    record the item of media as a recommendation for subsequent presentation to the second user in a view in a graphical user interface displayed by a browser, if the rating of the item of media is among the highest in comparison to the ratings of other items of media designated by users in the neighborhood.

10. The computer-readable storage medium as in claim 9, further comprising the operation of receiving as an input a log with a plurality of log entries, wherein each log entry includes an identifier for an item of media, an identifier for a user, and a time when the user designated the item.

11. The computer-readable storage medium as in claim 9, wherein the items of media include photographic images.

12. The computer-readable storage medium as in claim 9, wherein the map-reduce architecture includes a Pig implementation.

13. The computer-readable storage medium as in claim 9, wherein the log or sparse matrix is processed to remove stale entries.

14. The computer-readable storage medium as in claim 9, wherein recording of the second item of media as a recommendation depends on a measure of diversity.

15. The computer-readable storage medium as in claim 9, wherein in a user designates an item of media by bookmarking, marking as a favorite, "liking," or otherwise explicitly indicating an interest in the item of media.

16. The computer-readable storage medium as in claim 9, wherein in a user designates an item of media by viewing it for a particular period of time or otherwise implicitly indicating an interest in the item of media.

17. A method for recommending media on a social-software website, comprising the operations of:
    maintaining a log with a plurality of log entries, wherein each log entry includes an identifier for an item of media, an identifier for a user, and a time when the user designated the item;
    identifying similar users through collaborative filtering of the log, wherein the collaborative filtering employs a software framework based at least in part on a map-reduce architecture and a weighted Jaccard similarity measure;
    generating recommendations as to items of media using a weighted vote of the similar users in a neighborhood rating the item of media, wherein the weighted vote depends at least in part on the mean similarity of the similar users in the neighborhood who have designated the item of media; and presenting the recommendations that have the highest ratings in a view in a graphical user interface displayed by a browser, wherein each operation of the method is executed by one or more processors.

\* \* \* \* \*